(12) United States Patent  
Andres

(10) Patent No.: US 6,708,808 B1  
(45) Date of Patent: Mar. 23, 2004

(54) TORQUE-TRANSMITTING MECHANISM WITH A SELF-RETURNING PISTON

(75) Inventor: Marc Andres, Schiltigheim (FR)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/241,212

(22) Filed: Sep. 11, 2002

(51) Int. Cl.[7] ............................................... F16D 25/00
(52) U.S. Cl. .................... 192/85 AA; 188/71.5; 92/90
(58) Field of Search .................... 192/85 AA; 188/71.5, 188/72.4; 92/90, 105

(56) References Cited

U.S. PATENT DOCUMENTS

| | | | | |
|---|---|---|---|---|
| 2,715,343 A | * | 8/1955 | Youngren et al. | 192/85 AA |
| 2,775,330 A | * | 12/1956 | Schjolin et al. | 192/85 AA |
| 3,090,257 A | * | 5/1963 | Schjolin et al. | 192/85 AA |
| 3,213,984 A | * | 10/1965 | Cook | 192/85 AA |
| 3,576,241 A | * | 4/1971 | Maurice et al. | 192/85 AA |
| 3,832,934 A | * | 9/1974 | Dach et al. | 192/85 AA |
| 4,623,055 A | * | 11/1986 | Ohkubo | 192/85 AA |
| 4,690,037 A | * | 9/1987 | Sumiya et al. | 192/85 AA |
| 4,699,259 A | * | 10/1987 | McColl | 192/85 AA |
| 4,706,789 A | * | 11/1987 | McColl et al. | 192/85 AA |
| 4,730,713 A | * | 3/1988 | Pickard et al. | 192/85 AA |
| 5,335,763 A | * | 8/1994 | Katoh | 192/85 AA |
| 5,558,195 A | * | 9/1996 | Bucciero | 192/85 AA |
| 5,857,549 A | * | 1/1999 | Ross | 192/85 AA |

* cited by examiner

Primary Examiner—Rodney H. Bonck  
Assistant Examiner—Eric M. Williams  
(74) Attorney, Agent, or Firm—Leslie C. Hodges

(57) ABSTRACT

A torque-transmitting mechanism has first and second housing members, which are interconnected by a plurality of friction members. The torque-transmitting mechanism also includes an apply piston, which has an apply head slidably disposed within one of the housings and a spring body portion, which is effective to urge the apply head out of engagement with the friction members. The apply head is urged into engagement with the friction members through the application of pressure to an apply chamber formed between the apply head, the spring body, and the one housing. Upon release of the pressure within the apply chamber, the spring body enforces retraction of the apply head and disengagement of the torque-transmitting mechanism.

3 Claims, 1 Drawing Sheet

TORQUE-TRANSMITTING MECHANISM WITH A SELF-RETURNING PISTON

TECHNICAL FIELD

This invention relates to torque-transmitting mechanisms and, more particularly, to hydraulically actuated torque-transmitting mechanisms having at least one spring for returning the piston to a disengaged condition.

BACKGROUND OF THE INVENTION

Torque-transmitting mechanisms are used in automatic shifting power transmissions to effect ratio changes within the planetary gearing of the transmission. The torque-transmitting mechanisms generally include two housings, which are splined therewith friction discs or plates, which are interdigitated, such that upon engagement of the discs, torque is transmitted between the two housings. The friction discs or plates are actuated into a frictional torque transmitting arrangement and engagement by a fluid activated piston, which moves axially within a cylinder, which might be incorporated within one of the housings.

The piston is disengaged when the pressure in the apply chamber is reduced to a minimum number or value so that the piston can be returned from the engaged position to a disengaged position thereby permitting the friction discs to rotate relative to each other with their respective housings. The piston is urged out of engagement with the friction discs by at least one spring member, which usually either a Belleville spring or a coil spring assembly having a plurality of coil springs which are held in a single assembly within the torque transmitting mechanism.

The return spring means, as they are often termed, require axial space within the transmission and therefore add to the overall axial limit of the transmission in many instances. In current or modern day transmissions, the axial length of the transmission is becoming more and more important, particularly transverse-mounted transmissions in many front-wheel drive vehicles. Also, the shorter axial length transmissions reduce the intrusion into the operator cockpit on rear-wheel drive vehicles. This will, of course, reduce the well-known center hump in many of today's vehicles.

SUMMARY OF THE INVENTION

It is an object of the present invention to provide an improved torque-transmitting mechanism for a power transmission.

In one aspect of the present invention, the torque-transmitting mechanism incorporates a hydraulically actuated apply piston and a return spring mechanism.

In another aspect of the present invention, the return spring mechanism is an integral component of the apply piston.

In yet another aspect of the present invention, the apply piston and return spring provide at least one sidewall for an apply chamber for the torque-transmitting mechanism.

DESCRIPTION OF AN EXEMPLARY EMBODIMENT

Figure 1:
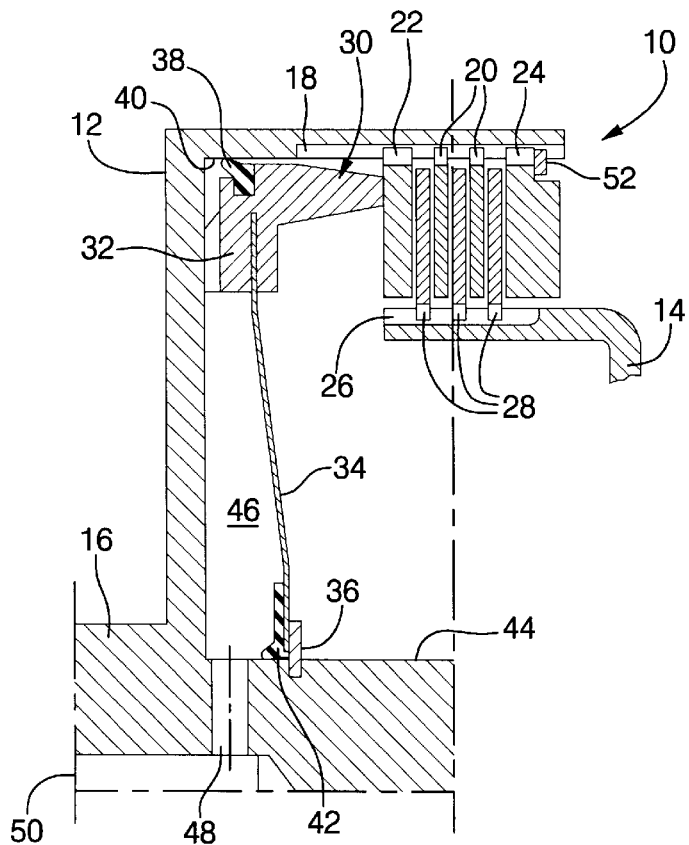
FIG. 1 is a cross-sectional elevational view of a torque-transmitting mechanism incorporating the present invention shown in the disengaged condition.
Figure 2:
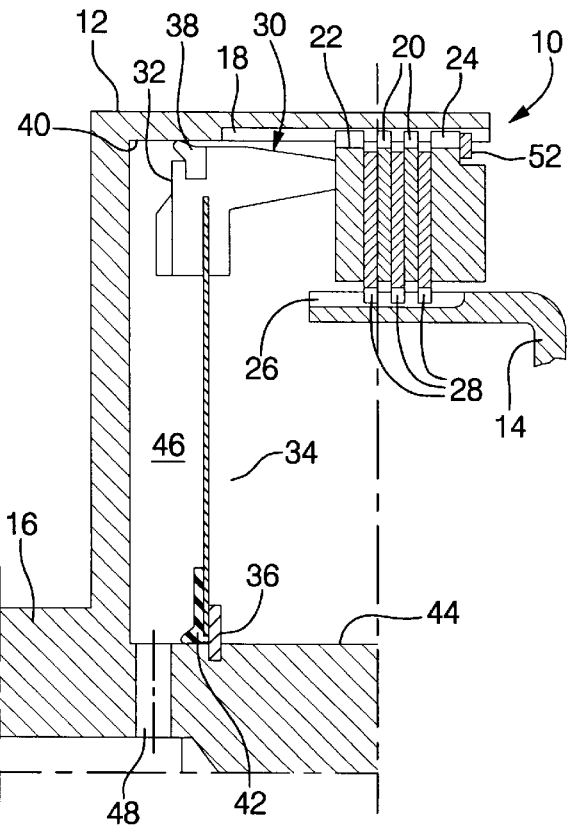
FIG. 2 is a cross-sectional elevational view of the torque-transmitting mechanism shown in FIG. 1 in an engaged condition.

Referring to the drawings, wherein like characters represent the same or corresponding parts throughout the several views, there is seen in FIGS. 1 and 2 a torque-transmitting mechanism, generally designated 10. The torque-transmitting mechanism 10 includes a first housing 12 and a second housing 14. The housings 12 and 14 can be both rotating housings or one of the housings can be a stationary housing. If both of the housings are rotatable housings, the torque-transmitting mechanism 10 is commonly referred to as a clutch. If one of the housings is a stationary member, the torque-transmitting mechanism is commonly referred to as a brake or reaction clutch.

The housing 12 is integral with or otherwise secured to a shaft 16 and the housing 14 is connected with a transmission member such as a gear, not shown. The housing 12 has a spline portion 18 in which is drivingly connected a plurality of friction plates or discs 20, a pressure plate or disc 22, and a backing plate or disc 24. The housing 14 has a spline portion 26 in which is drivingly connected a plurality of friction discs or plates 28.

In general practice, the plates or discs 20, 22, and 24 are constructed of carbon steel. The friction discs 28 are generally constructed with a carbon steel core with a friction lining bonded thereto. The construction of these friction plates is well known to those skilled in the art.

A piston 30 is slidably disposed in the housing 12. The piston 30 has a piston head or apply head 32 and a spring portion or member 34. The spring portion 34 is secured in the apply head 32 and limited in rightward movement by a conventional locking ring 36. The spring portion 34 can be constructed in accordance with the washer or Belleville spring construction, which is well known in the art. The spring 34 is a solid annular member, which is impervious to fluid flow.

An annular seal member 38 is secured within the apply head 32. The seal 38 sealingly engages an inner annular surface 40 of the housing 12. A second annular seal 42 is bonded or otherwise secured to the spring member 34 and sealingly engages an inner surface 44 of the housing 12 or shaft 16.

The spring member 34, apply head 32, and seals 38 and 42 cooperate to form a fluid chamber 46, which is disposed in fluid communication with a pair of passages 48 and 50. The passages 48 and 50 are connected with a conventional hydraulic control system for a power transmission, not shown.

When fluid pressure is admitted to the chamber 46, the apply head 32 of the piston 30 will move from the position shown in FIG. 1 to the position shown in FIG. 2. It will be appreciated that in FIG. 1, the friction discs 28 are free to rotate relative to the friction discs 20, 22, and 24. However, in the position shown in FIG. 2 when the chamber 46 is pressurized above a predetermined value, the apply head 32 will abut the apply plate 22 forcing axial movement thereof which will enforce frictional engagement between the disc 22, the discs 20, the backing plate 24, and the friction discs 28. The backing plate 24 limits the leftward movement of the friction discs 20 and 28 through a conventional locking ring 52, which is secured in the housing 12. When the discs 20, 22, and 24 are fully engaged with the discs 28, the housing 12 and the housing 14 will rotate in unison with the torque-transmitting mechanism 10 as a clutch, or will be held stationary with the torque-transmitting mechanism 10 as a brake.

When the pressure in the chamber 46 is reduced below a predetermined value, the spring portion 34 will urge the apply head 32 leftward to the position shown in FIG. 1, thereby disengaging the friction plates 28 and 20. Thus, the torque-transmitting mechanism 10 will be disengaged permitting relative rotation between the housings 12 and 14.

The plate 22, friction plates 20, and backing plate 24 as well as the friction plates 28 are commonly termed a clutch path or a friction path. The number of friction plates employed in a clutch path is determined by the average radius of the friction discs or plates as well as the maximum torque value to the transmitted and the apply pressure to be employed.

What is claimed is:

1. A torque-transmitting mechanism comprising:
    a first housing having drivingly connected therewith a plurality of first friction members;
    a second housing having drivingly connected therewith a plurality of second friction members, said first and second friction members being alternately spaced to form a friction path;
    an apply piston having an apply head and a spring body having a portion secured in said apply head, said apply head being slidably disposed in one of said housings and said spring body being limited in axial movement at a radial inner rim of one said housing through a locking ring;
    an apply chamber formed by one of said housings and said apply piston, including both said apply head and said spring body;
    means for applying fluid pressure to said apply chamber to enforce axial movement of said apply head toward said friction path to cause engagement of said first and second friction members thereby completing a torque-transmitting path between said first and second housings; and
    said spring body being effective to retract said apply head from said friction path when the pressure in said apply chamber is reduced below a predetermined value.

2. The torque-transmitting mechanism defined in claim 1 further comprising:
    an annular seal secured at the outer periphery of the apply head sealingly engaging an outer peripheral surface of said apply chamber.

3. The torque-transmitting mechanism defined in claim 1 further comprising:
    an annular seal secured at an inner periphery of said spring body and sealingly engaging an inner peripheral surface of said apply chamber.

* * * * *